(12) United States Patent
Mullins et al.

(10) Patent No.: US 8,455,826 B2
(45) Date of Patent: Jun. 4, 2013

(54) VARIABLE APERTURE MECHANISM RETENTION DEVICE

(75) Inventors: Richard N. Mullins, Goleta, CA (US);
Michael L. Brest, Goleta, CA (US);
Kenneth L. McAllister, Goleta, CA (US)

(73) Assignee: Raytheon Company, Waltham, MA (US)

( * ) Notice: Subject to any disclaimer, the term of this patent is extended or adjusted under 35 U.S.C. 154(b) by 228 days.

(21) Appl. No.: 12/762,161

(22) Filed: Apr. 16, 2010

(65) Prior Publication Data

US 2011/0253895 A1   Oct. 20, 2011

(51) Int. Cl.
*G01J 5/00*   (2006.01)

(52) U.S. Cl.
USPC ...................................... 250/338.1

(58) Field of Classification Search
USPC ................ 250/338.1–338.5, 339.01–339.16, 250/340, 341.1–341.8, 342
See application file for complete search history.

(56) References Cited

U.S. PATENT DOCUMENTS

| | | | |
|---|---|---|---|
| 4,113,359 A | 9/1978 | Koike et al. | |
| 5,293,542 A | 3/1994 | Ise et al. | |
| 5,371,369 A | 12/1994 | Kent | |
| 5,966,945 A | 10/1999 | Mengel et al. | |
| 5,994,699 A | 11/1999 | Akagawa | |
| 6,133,569 A | 10/2000 | Shoda et al. | |
| 6,174,061 B1 | 1/2001 | Cooper | |
| 6,707,044 B2 | 3/2004 | Lannestedt et al. | |
| 7,157,706 B2 | 1/2007 | Gat et al. | |
| 7,245,347 B2 | 7/2007 | Lundgren | |
| 7,297,951 B2 | 11/2007 | Chen et al. | |
| 7,427,758 B2 | 9/2008 | Garman et al. | |
| 7,630,148 B1 | 12/2009 | Yang et al. | |
| 7,655,911 B2 | 2/2010 | Murphy et al. | |
| 7,679,839 B2 | 3/2010 | Polyakov et al. | |
| 2001/0046566 A1 | 11/2001 | Chu et al. | |
| 2003/0161049 A1 | 8/2003 | Okada et al. | |
| 2004/0211907 A1 | 10/2004 | Wellman et al. | |
| 2004/0238741 A1 | 12/2004 | Gat et al. | |
| 2006/0255275 A1 | 11/2006 | Garman et al. | |
| 2007/0045557 A1 | 3/2007 | Angel et al. | |
| 2008/0304126 A1 | 12/2008 | Powell et al. | |

OTHER PUBLICATIONS

Gat et al., "Variable Cold Stop for Matching IR Cameras to Multiple f-number Optics," 1997, Proceedings of SPIE, vol. 6542, pp. 65420y-1 to 65420y-10.*
U.S. Appl. No. 12/629,676, entitled "Stabilization of Cold Shield Bodies", by Richard N. Mullins, filed Dec. 2, 2009, with drawings (26 pages).

* cited by examiner

*Primary Examiner* — Kiho Kim
(74) *Attorney, Agent, or Firm* — Lando & Anastasi, LLP

(57) ABSTRACT

According to one embodiment, an optical device includes a variable aperture mechanism configured on a structure having a radiation detector that receives radiation through an aperture of the variable aperture mechanism. The aperture is selectively movable from a first position to a second position in which the aperture has a different size relative to the aperture in the first position. The structure is configured with one or more magnets that function with one or more magnetically permeable members configured on the variable aperture mechanism to hold the variable aperture mechanism in at least one position using a magnetic force between the magnets and magnetically permeable members.

16 Claims, 2 Drawing Sheets

VARIABLE APERTURE MECHANISM RETENTION DEVICE

GOVERNMENT RIGHTS

This invention was made with government support under government contract number W15P7T-09-C-M201. The Government may have certain rights in this invention.

TECHNICAL FIELD

This invention relates generally to the field of optical devices, and more specifically, to a retention device for a variable aperture mechanism.

BACKGROUND

Optical devices, such as video cameras and infrared cameras are useful for generating imagery using radiation emitted or reflected from objects. The optical devices typically include radiation detectors that generate signals representing received radiation. In many cases, optical devices such as these may include variable aperture mechanisms that normalize the amount of radiation incident upon their radiation detectors using apertures that are variable in size.

SUMMARY OF THE DISCLOSURE

According to one embodiment, an optical device includes a variable aperture mechanism configured on a structure having a radiation detector that receives radiation through an aperture of the variable aperture mechanism. The aperture is selectively movable from a first position to a second position in which the aperture has a different size relative to the aperture in the first position. The structure is configured with one or more magnets that function with one or more magnetically permeable members configured on the variable aperture mechanism to hold the variable aperture mechanism in at least one position using a magnetic force between the magnets and magnetically permeable members.

Certain embodiments of the invention may provide one or more technical advantages. A technical advantage of one embodiment may include enhanced thermal insulation for cameras that function at cryogenic temperatures, such as forward looking infrared radars (FLIRs) that process optical radiation at infrared wavelengths. In many cases, these infrared radars are configured in insulated housings, such as Dewar devices, to maintain their radiation detectors at temperatures substantially below the ambient environment. Variable aperture mechanisms used with these devices often require physical coupling mechanisms to keep the variable aperture mechanism stable when subjected to vibration and/or shock forces. These physical coupling mechanisms, however, may provide a thermal path that reduces the thermal insulating efficiency of the insulated housing. The optical device configured with magnets and associated magnetic permeable members according to the teachings of the present invention may provide a solution to this problem by stabilizing the variable aperture mechanism while using a physical coupling technique that does not provide a thermal path for reducing the thermal efficiency of the insulated housings in which the infrared camera is housed.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
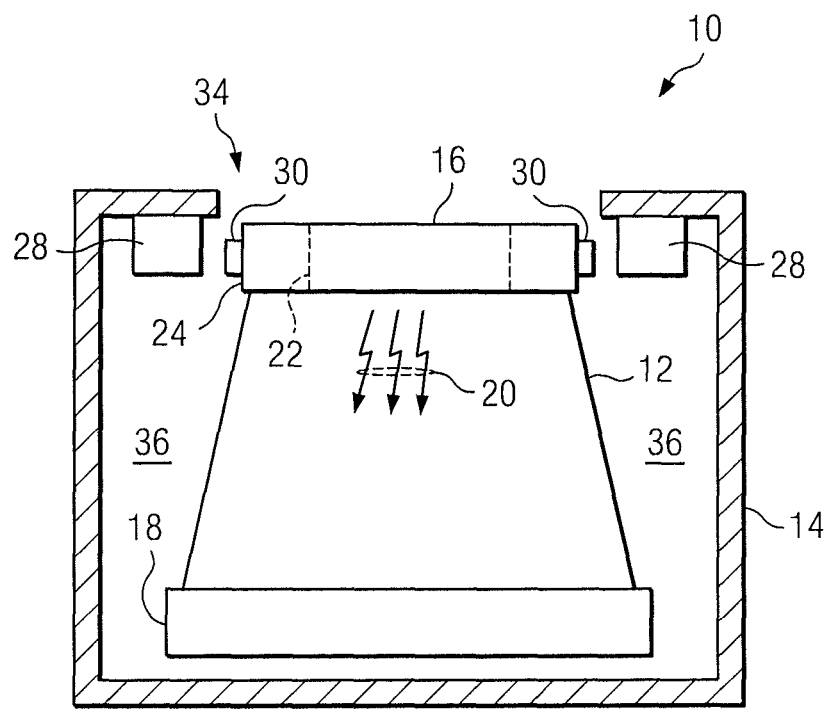
FIG. 1 shows one embodiment of an optical device that may benefit from the teachings of the present disclosure.

FIG. 1 shows one embodiment of an optical device that may benefit from the teachings of the present disclosure. Optical device 10 includes a structure 12 configured inside a housing 14. Structure 12 includes a variable aperture mechanism 16 and a radiation detector 18 that generates signals representing radiation 20 received through an aperture 22 of variable aperture mechanism 16. Aperture 22 has a size that may be proportionally adjusted by movement of an outer ring 24 of variable aperture mechanism 16. As will be described in detail below, optical device 10 includes one or more magnets 28 that function with magnetically permeable members 30 configured on outer ring 24 to maintain the aperture 22 of variable aperture mechanism 16 in a selected position by magnetic attraction of magnets 28 with magnetically permeable members 30.

In the particular embodiment shown, structure 12 is configured in a housing 14 with a window 34 through which variable aperture mechanism 16 may receive radiation 20 from the outside environment. The space between structure 12 and housing 14 forms a vacuum chamber 36 for thermally insulating structure 12 from the outside environment. In other embodiments, optical device 10 may be void of housing 14 and associated vacuum chamber 36 if thermal insulation of structure 12 is not needed or desired.

In one embodiment, variable aperture mechanism 16 changes the size of its aperture 22 by rotational movement of its outer ring 24 relative to variable aperture mechanism 16. In another embodiment, rotational movement of outer ring 24 may be facilitated by one or more electric motors (not shown) that rotate outer ring 24 such that a desired size of aperture 22 is attained. Although set to a desired size, outer ring 24 may rotate autonomously due to several factors, including, but not limited to, vibrational or shock forces incident upon housing 14 and/or variable aperture mechanism 16 when optical device 10 is used in an uncontrolled environment.

Certain embodiments of optical device 10 utilizing magnets 28 and associated magnetically permeable members 30 may provide an advantage in that a desired aperture size of variable aperture mechanism 16 may be maintained without its direct physical coupling to housing 14. Devices, such as struts or other members extending between variable aperture mechanism 16 and housing 14 may form a thermal conduction path for the movement of heat between variable aperture mechanism 16 and housing 14, thus reducing the effective thermal insulation provided by vacuum chamber 36. Magnets 28 and associated magnetically permeable members 30 may provide a solution to this problem by applying a force to variable aperture mechanism 16 for maintaining its selected aperture size without direct contact with variable aperture mechanism 16 or structure 12.

Housing 14 may be any suitable enclosure for the components of optical device 10. In some embodiments, housing 14 provides an environmentally sealed and controlled enclosure for components of optical device 10, including radiation detector 18, structure 12, and aperture 22. Housing 14 may comprise any suitable material, such as plastic or metal, and may be any suitable shape, such as tubular or cubic. In certain embodiments, housing 14 comprises a Dewar for an infrared detector, such as a cryogenically-cooled Dewar.

Window 34 of housing 14 allows radiation 20 to pass into housing 14, reaching other components of optical device 10. Window 34 may be optically aligned with particular components of optical device 10, such as aperture 22, to facilitate transmission of radiation 20 to radiation detector 18.

Radiation detector 18 may be any device that detects electromagnetic radiation 20, such as gamma rays, visible light, or infrared radiation. Radiation detector 18 may include any appropriate components for detecting radiation 20, including radiation-sensitive photocells, sensors, one or more lenses, computers, processors, electronics, and other components.

In some embodiments, radiation detector 18 is capable of detecting multiple wavelengths. Examples of radiation detector 18 may include an infrared sensor or camera capable of detecting multiple wavelengths of infrared radiation, such as long and short infrared wavelengths. Additionally, examples of radiation detector 18 may include a single-color, two-color, or dual band mid-long infrared camera or detector.

In certain embodiments, radiation detector 18 may include one or more cameras, such as infrared cameras, with multiple lenses. In one embodiment radiation detector 18 includes an infrared camera to be used in a wide variety of rapidly-changing target-scene radiation conditions. In such an embodiment, radiation detector 18 may have interchangeable lenses with different f-numbers. As an additional example, radiation detector 18 may include a two-color infrared camera with one or more wide-angle and telescoping lenses.

In certain embodiments, radiation detector 18 comprises an infrared detector with infrared-sensitive photocells. Such photocells are very sensitive to thermal infrared radiation emitted by any object at a temperature above absolute zero, including components of optical device 10. Because thermal infrared radiation decreases rapidly as the temperature of an object decreases, operation of radiation detector 18 may be improved by cooling structure 12 to prevent undesirable thermal radiation from reaching radiation detector.

Accordingly, teachings of certain embodiments recognize that structure 12 may comprise a cold shield and/or a cold stop wherein a cooling system is used to maintain structure 12 at a fixed temperature. In some embodiments, structure 12 is cooled to a certain temperature that allows only a negligible amount of radiation to reach radiation detector 18. Moreover, because a fixed temperature may have a known effect on radiation detector 18, that effect can be accounted for and removed when the images are processed.

Similarly, radiation detector 18, aperture 22, and other components of optical device 10 may also be cooled to reduce unwanted radiation and improve the radiation sensitivity of optical device 10. For example, structure 12 and/or other components of optical device 10 may be cryogenically cooled to the temperature of radiation detector 18. Any suitable cooling device or method may be used in such embodiments. For example, a thermoelectric cooler, such as a Pettier cooler, may be used to cool structure 12 and other components of optical device 10. Structure 12 and other components of optical device 10 may be integrated into Dewars and may include liquid nitrogen or liquid helium, Stirling cryo-generators, Gifford-McMahon mechanical coolers, and other such devices.

Some or all components of optical device 10 may be maintained in vacuum chamber 36. Within vacuum chamber 36, structure 12, radiation detector 18, and aperture 22 may be maintained at a low or cryogenic temperature, based on photocell requirements and the desired performance. Vacuum chamber 36 may be a chamber defined by housing 14. Vacuum chamber 36 may advantageously reduce thermal load on cooling systems associated with components of optical device 10.

Structure 12 may include any suitable vessel for supporting and/or protecting components of optical device 10, such as radiation detector 18 and variable aperture mechanism 16. In certain embodiments, structure 12 is designed to reduce unwanted radiation (e.g., radiation not emitted from the target object or field) emanating from housing 14 or other components associated with optical device 10 from reaching radiation detector 18. In such embodiments, structure 12 may be any appropriate structure designed to block or otherwise prevent radiation detector 18 from "seeing" undesirable radiation. Structure 12 may comprise any suitable material, such as plastic, aluminum, nickel, or copper.

Variable aperture mechanism 16 may include any suitable device to receive, reflect, and/or block incoming radiation 20 with an adjustable aperture 22. Variable aperture mechanism 16 may be coupled to or mounted on structure 12 in any appropriate manner to provide an entrance pupil or aperture for optical device 10. Alternatively, variable aperture mechanism 16 may be coupled to or mounted on any other suitable structure associated with optical device 10, such as housing 14 or window 34.

Figure 2A:
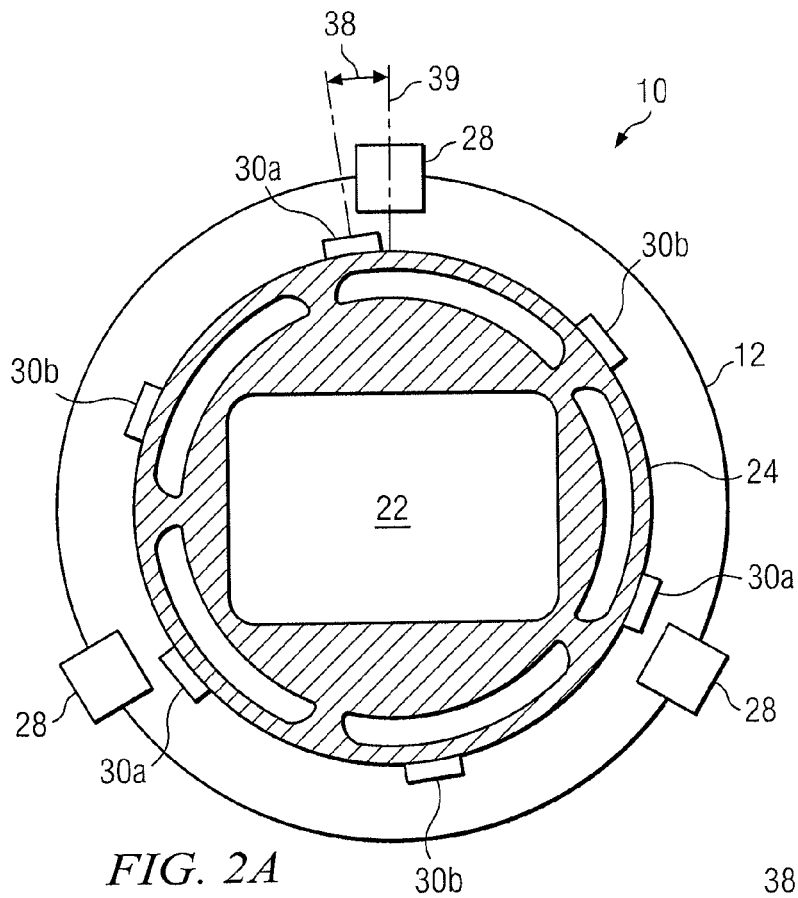
FIGS. 2A and 2B are illustrations showing top views of the optical device with its variable aperture mechanism in an open position and a closed position, respectively.
Figure 2B:
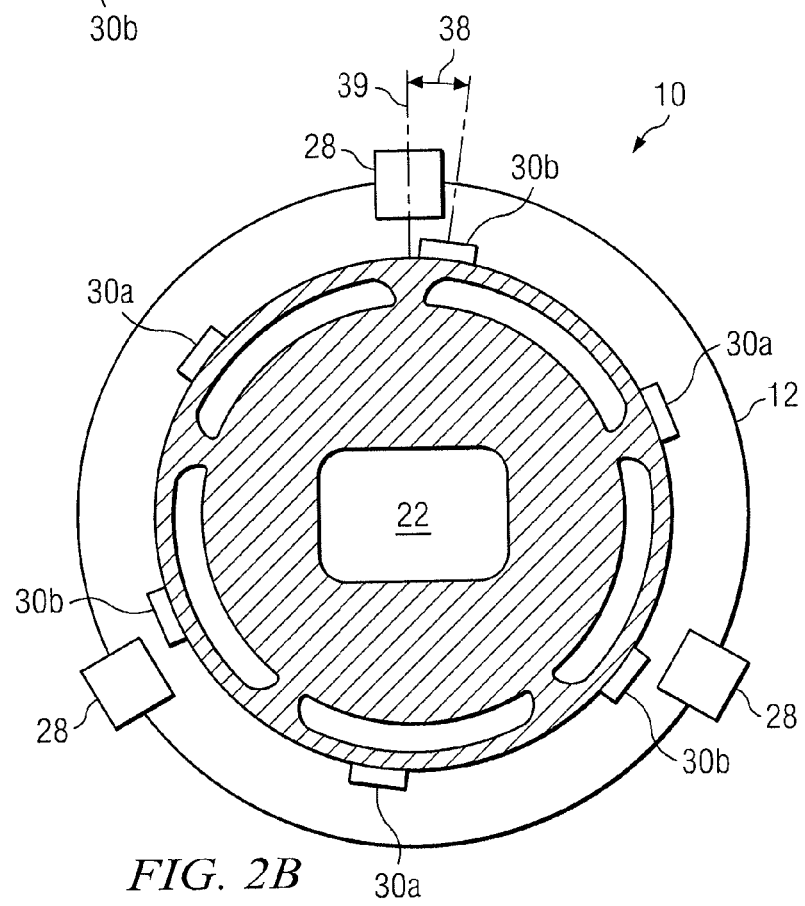

FIGS. 2A and 2B are illustrations showing top views of the optical device 10 with its variable aperture mechanism 16 in an open position and a closed position, respectively. Each magnet 28 is associated with a first magnetically permeable member 30a that maintains outer ring 24 in an open position (FIG. 2A) and a second magnetically permeable member 30b that maintains outer ring 24 in the closed position (FIG. 2B).

The open position (FIG. 2A) generally refers to a position of variable aperture mechanism 16 in which its aperture 22 is mostly or completely open. The open position of variable aperture mechanism 16 may be selected when a relatively large amount of radiation 20 incident upon radiation detector 18 is desired. Conversely, the closed position (FIG. 2B) of variable aperture mechanism 16 may be selected when a relatively lesser amount of radiation 20 incident upon radiation detector 18 is desired.

The particular embodiment shown describes two positions (e.g. open position and closed position) that may be maintained by magnets 28 and their associated magnetically permeable members 30. In other embodiments, magnets 28 may maintain outer ring 24 in any quantity of desired positions, such as one position or three or more positions. For example, each magnet 28 may be associated with three magnetically permeable members 30 that maintain outer ring 24 in the open position, closed position, and a partially open position in which the size of aperture 22 is greater than that of the closed position and less than that of the open position.

Any quantity of magnets 28 and associated magnetically permeable members 30 may be implemented with optical device 10. In the particular embodiment shown, three magnets 28 are used. In other embodiments, one, two, or four or more magnets 28 that are each associated with magnetically permeable members 30 configured on variable aperture mechanism 16 may be implemented to maintain outer ring 24 at one or more desired positions.

Magnets 28 may be any type that applies a magnetic attraction force magnetically permeable members 30. In one embodiment, magnets 28 are permanent magnets, such as samarium-cobalt magnets that develop an essentially permanent magnetic B-field around their periphery. In another embodiment, magnets 28 may be coil-wound magnets that develop a magnetic B-field in response to an electrical current applied to a coil (not shown) configured on each magnet 28.

Magnetically permeable members 30 may be made of any material having a relatively high level of magnetic permeability. Examples of such materials may include, but not limited to, nickel and iron. In one embodiment, magnetically permeable members 30 may comprise permanent magnets with their poles aligned in a manner to provide an attractive force to their associated magnets 28 when outer ring 24 is at a desired position. Magnets 28 and their associated magnetically permeable members 30 may be selected to provide a force suitable for maintaining outer ring 24 in a desired position, yet sufficiently weak to allow outer ring 24 to rotate under influence from a motor drive that is configured to rotate outer ring 24.

In one embodiment, magnetically permeable members 30 may be configured on outer ring 24 to have an offset angle 38 relative to the axial position of their associate magnets 28 when outer ring 24 is at a desired position. The offset angle 38 generally refers to an angular deviation of the central portion of each magnetically permeable member 30 from the axis 39 of its associated magnet 28. If magnetically permeable members 30 were positioned on outer ring 24 with no offset angle 38, movement of magnetically permeable members 30 relative to magnets 28 could occur with relatively little change in flux density in the magnetic field generated by each magnet 28. By placement of magnetically permeable members 30 at an offset angle 38 relative to magnets 28 a smaller movement may cause a relatively larger change in flux density for increased force of magnets 28 upon magnetically permeable members 30.

Figure 3:
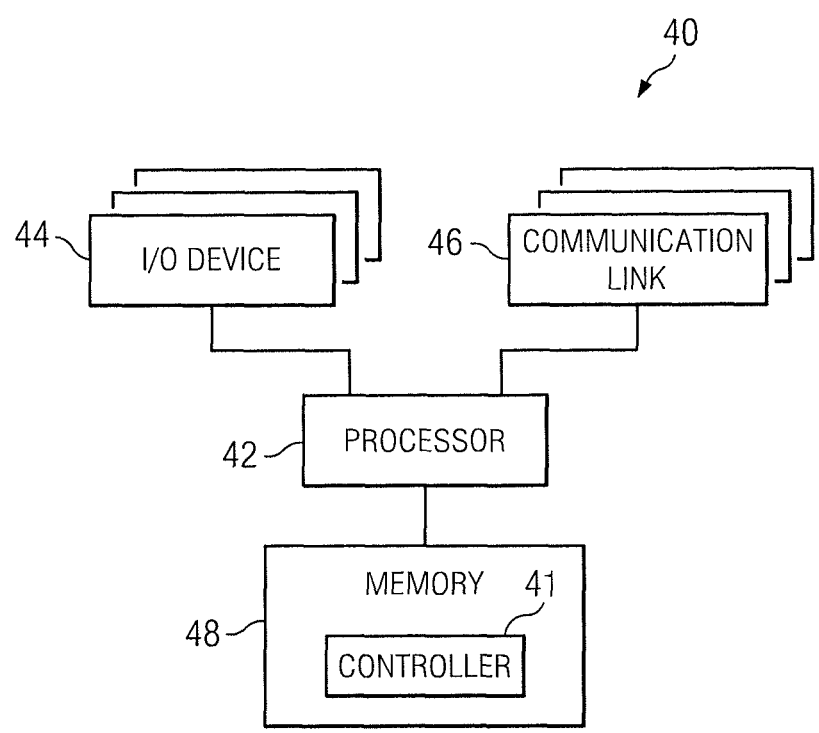
FIG. 3 is a diagram showing an example computer system that may be used to control operation of the variable aperture mechanism of FIG. 1.

FIG. 3 is an diagram showing an example computer system 40 that may execute a controller 41 to control operation of the variable aperture mechanism 16 of FIG. 1. Computer system 40 may include a processor 42, one or more input/output devices 44, one or more communication links 46, and a memory 48. In other embodiments, computer system 40 may include more, less, or other components. Computer system 40 may be operable to perform one or more operations of various embodiments. Although the embodiment shown in FIG. 2 provides one example of computer system 40 that may be used with other embodiments, such other embodiments may additionally utilize computers other than the computer system 40. Additionally, embodiments may also employ multiple computer systems 40 or other computers networked together in a computer network. Multiple computer systems 40 or other computers may be networked through the Internet and/or in a client-server network. Embodiments of the invention may also be used with a combination of separate computer networks each linked together by a private or a public network.

Several embodiments may include processors 42 operable to execute logic contained within a medium. Examples of processor 42 include one or more microprocessors, one or more applications, and/or other logic. Computer system 40 may include one or multiple processors 42.

Several embodiments may include one or more input/output devices. Input/output devices 44 may include any device or interface operable to enable communication between computer system 40 and external components, including communication with a user or another system. Example input/output devices 44 may include, but are not limited to, a mouse, keyboard, display, and printer.

Communication links 46 may be connected to any number and combination of wireline and/or wireless networks suitable for data transmission. Communications links 26 may, for example, communicate internet protocol packets, frame relay frames, asynchronous transfer mode cells, and/or other suitable information between network addresses. Communication links 46 may be connected to a computer network or a variety of other communicative platforms including, but not limited to, a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. In one example embodiment, communications links 26 may be connected to one or more networks 800 of FIG. 1.

In the particular embodiment shown, controller 41 is stored in memory 48 and executed by processor 42. In other embodiments, operations of controller 41 may include any type of logic contained within a medium. Logic may include hardware, software, and/or other logic. Logic may be encoded in one or more tangible media and may perform operations when executed by a computer. Logic may include a computer program, software, computer executable instructions, and/or instructions capable of being executed by computer system 10. Example logic may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 48. Memory 48 may comprise one or more tangible, non-transitory, computer-readable, and/or computer-executable storage medium. Examples of memory 48 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Computer system 40 may include any suitable hardware or software for using, controlling, monitoring, maintaining, or otherwise operating optical device 10 in any appropriate manner. For example, computer system 40 may be operable to select or specify a target, field of view, lens, f-number, entrance pupil, aperture size, or wavelength associated with optical device 10. Computer system 40 may also be operable to control a variable aperture 22. For example, in one embodiment, computer system 40 may be operable to selectively open, close, and/or hold particular microshutter cells in a microshutter array to provide a variable-size entrance pupil or aperture for optical device 10. Computer system 40 may also be operable to receive, process, store, and communicate data sent, received, or generated by optical device 10. Computer system 40 may be located within or outside housing 14 and may be physically and/or electronically coupled to the components of optical device 10 in any suitable manner. In certain embodiments, such computer systems are located outside housing 14 to avoid excess heat or radiation load on the components of optical device 10.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

What is claimed is:

1. An optical device comprising:
    a variable aperture mechanism having a first magnetically permeable member disposed thereon and an aperture that is selectively movable from a first position to a second position in which the aperture has a different size relative to the aperture in the first position, the variable aperture mechanism being physically coupled to a structure having a radiation detector that receives radiation through the aperture;
    at least one magnet physically coupled to a housing that houses the structure, the at least one magnet operable to hold the variable aperture mechanism in the first position by exerting a magnetic force on the first magnetically permeable member; and
    a vacuum chamber formed between the housing and the structure, the vacuum chamber thermally insulating the structure from the housing, wherein the at least one magnet physically coupled to the housing is disposed within the vacuum chamber.

2. The optical device of claim 1, wherein the at least one magnet is operable to hold the variable aperture mechanism in the second position by exerting a magnetic force on a second magnetically permeable member configured on the variable aperture mechanism.

3. The optical device of claim 1, wherein the variable aperture mechanism comprises an outer ring that is selectively rotatable from the first position to the second position.

4. The optical device of claim 1, wherein the at least one magnet comprises three magnets.

5. The optical device of claim 1, wherein the first magnetically permeable member is positioned at an offset angle relative to the at least one magnet when the variable aperture mechanism is in the first position.

6. An apparatus comprising:
    a structure comprising:
        a radiation detector; and
        a variable aperture mechanism having a first magnetically permeable member disposed thereon and an aperture that is selectively movable from a first position to a second position in which the aperture has a different size relative to the aperture in the first position;
    a housing that houses the structure;
    at least one magnet physically coupled to the housing, the at least one magnet operable to hold the variable aperture mechanism in the first position by exerting a magnetic force on the first magnetically permeable member; and
    a vacuum chamber formed between the housing and the structure, the vacuum chamber thermally insulating the structure from the housing, wherein the at least one magnet physically coupled to the housing is disposed within the vacuum chamber.

7. The apparatus of claim 6, wherein the at least one magnet is operable to hold the variable aperture mechanism in the second position by exerting a magnetic force on a second magnetically permeable member configured on the variable aperture mechanism.

8. The apparatus of claim 6, wherein the variable aperture mechanism comprises an outer ring that is selectively rotatable from the first position to the second position.

9. The apparatus of claim 6, wherein the at least one magnet comprises three magnets.

10. The apparatus of claim 6, wherein the first magnetically permeable member is positioned at an offset angle relative to the at least one magnet when the variable aperture mechanism is in the first position.

11. A method comprising:
    providing a structure comprising a radiation detector and a variable aperture mechanism, the variable aperture mechanism having a first magnetically permeable member disposed thereon and an aperture that is selectively movable from a first position to a second position in which the aperture has a different size relative to the aperture in the first position;
    providing a housing having at least one magnet disposed thereon;
    providing a vacuum chamber formed between the housing and the structure, the vacuum chamber thermally insulating the structure from the housing, wherein the at least one magnet is disposed within the vacuum chamber; and
    holding the variable aperture mechanism in the first position by exerting a magnetic force on the first magnetically permeable member using the at least one magnet.

12. The method of claim 11, further comprising holding the variable aperture mechanism in the second position by exerting a magnetic force on a second magnetically permeable member configured on the variable aperture mechanism.

13. The method of claim 11, wherein providing a housing comprises providing a housing that houses the structure.

14. The method of claim 11, further comprising rotating an outer ring of the variable aperture mechanism from the first position to the second position.

15. The method of claim 11, wherein the at least one magnet comprises three magnets.

16. The method of claim 11, wherein the first magnetically permeable member is positioned at an offset angle relative to the at least one magnet when the variable aperture mechanism is in the first position.

* * * * *